United States Patent [19]

Shultz

[11] 4,168,766
[45] Sep. 25, 1979

[54] METHOD AND APPARATUS FOR INJECTING VISCOUS MATERIALS

[76] Inventor: William E. Shultz, 239 N. Main St., Lombard, Ill. 60148

[21] Appl. No.: 914,592

[22] Filed: Jun. 12, 1978

[51] Int. Cl.² .................. F01M 11/00; F16N 3/10
[52] U.S. Cl. ............................ 184/1 D; 141/357
[58] Field of Search ............... 184/1 D; 141/367, 383, 141/357; 222/162

[56] References Cited

U.S. PATENT DOCUMENTS

| 1,991,542 | 2/1935 | Cavanaugh | 184/1 D |
| 2,168,746 | 8/1939 | Saal et al. | 184/1 D |
| 2,178,816 | 11/1939 | Sibley | 184/1 D |
| 2,187,608 | 1/1940 | Kropp | 184/1 D |
| 2,515,208 | 7/1950 | Fox et al. | 184/1 D |
| 2,601,169 | 6/1952 | Purvis | 141/357 X |
| 3,717,222 | 2/1973 | Moline | 184/1 D |

Primary Examiner—David H. Brown
Attorney, Agent, or Firm—Mason, Kolehmainen, Rathburn & Wyss

[57] ABSTRACT

A method and apparatus are disclosed for greasing an article such as a wheel bearing in a common vice including a housing defining an internal grease chamber including a first open end; a dished piston slideably insertable into said chamber, including a threaded aperture; a stem threadably mounted in the piston aperture; and a tapered spool compression application member disposed over the stem for forcing the piston against the grease to cause grease to pass through the piston and into the bearing.

14 Claims, 14 Drawing Figures

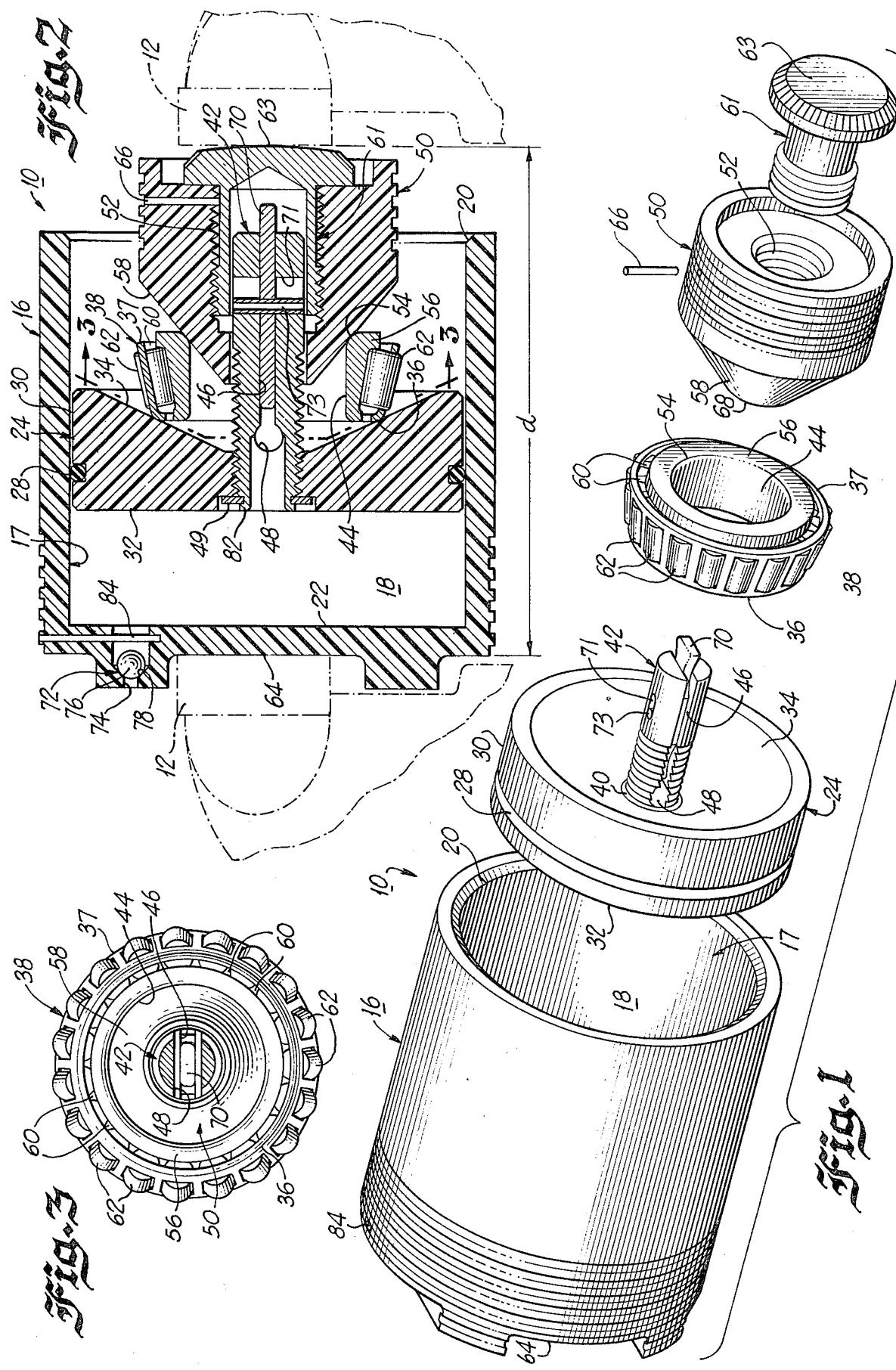

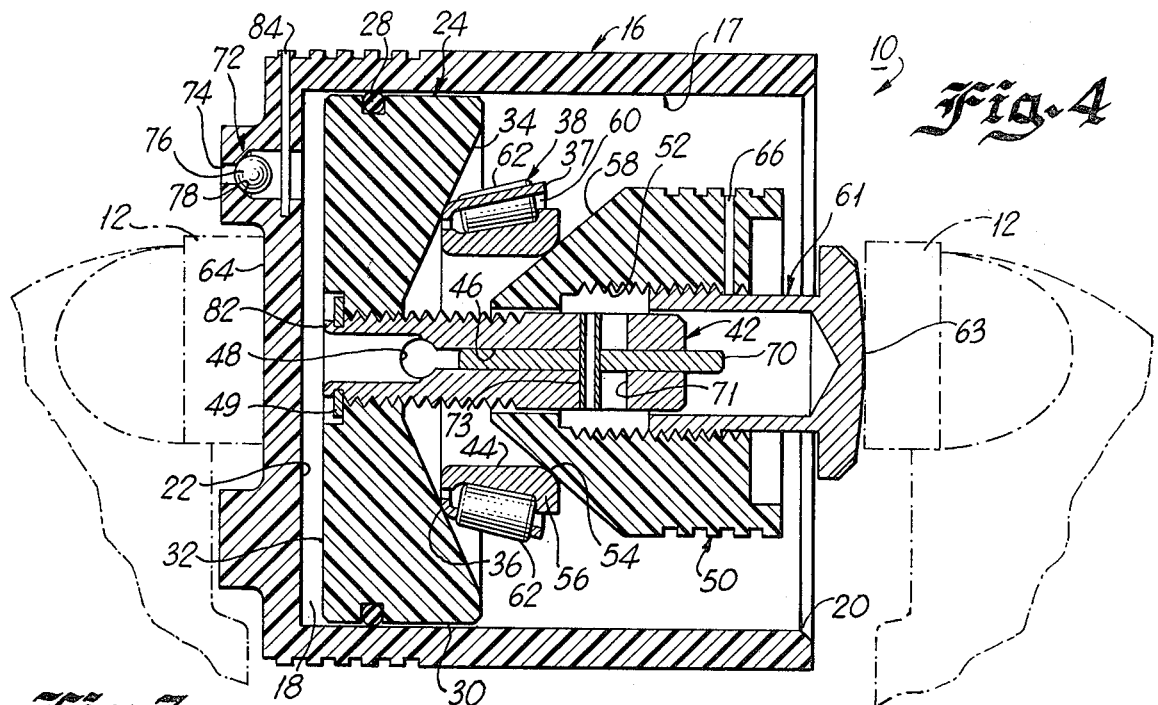
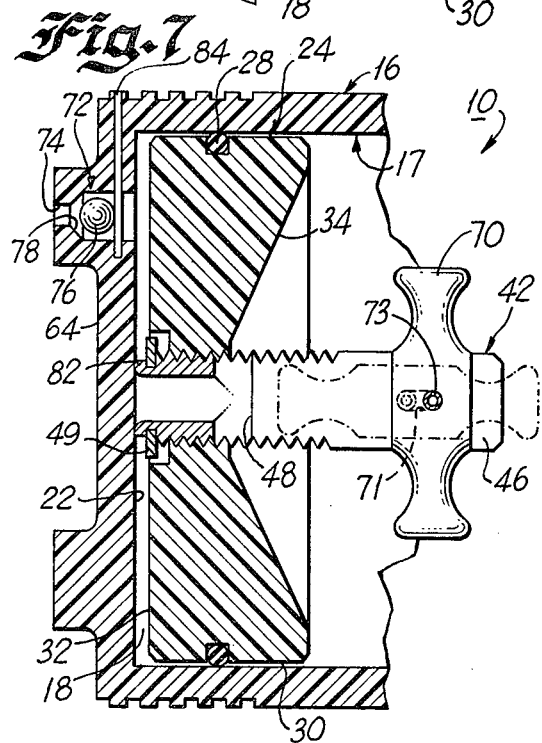
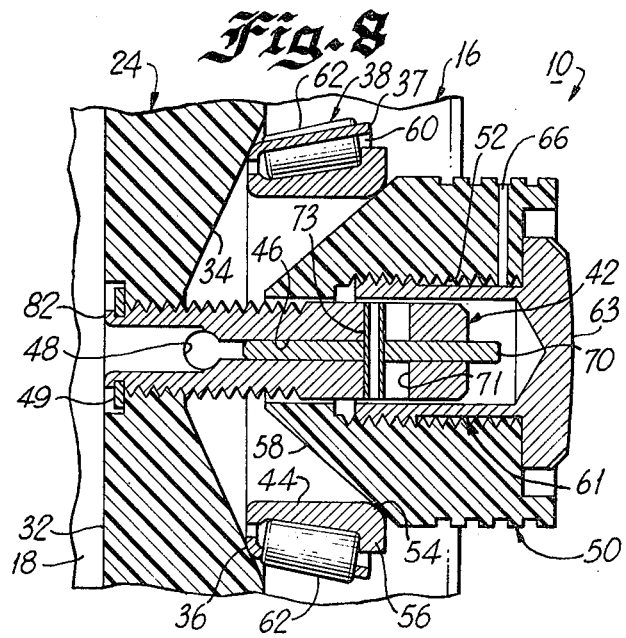
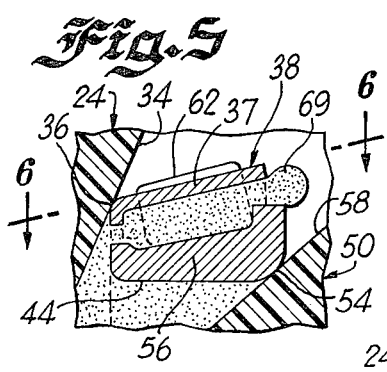
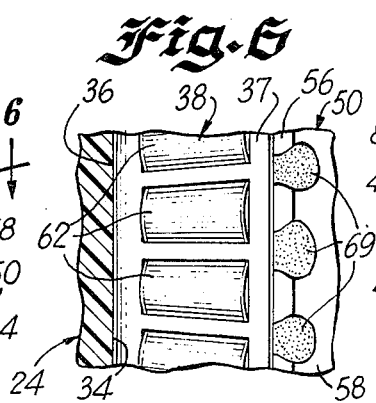
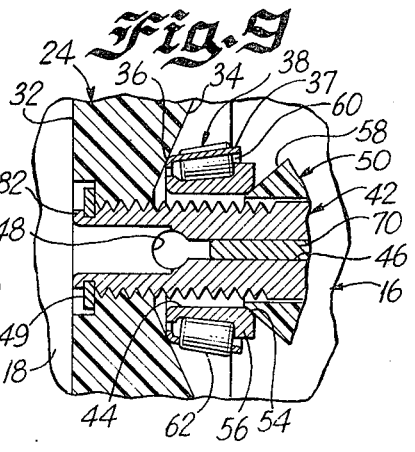

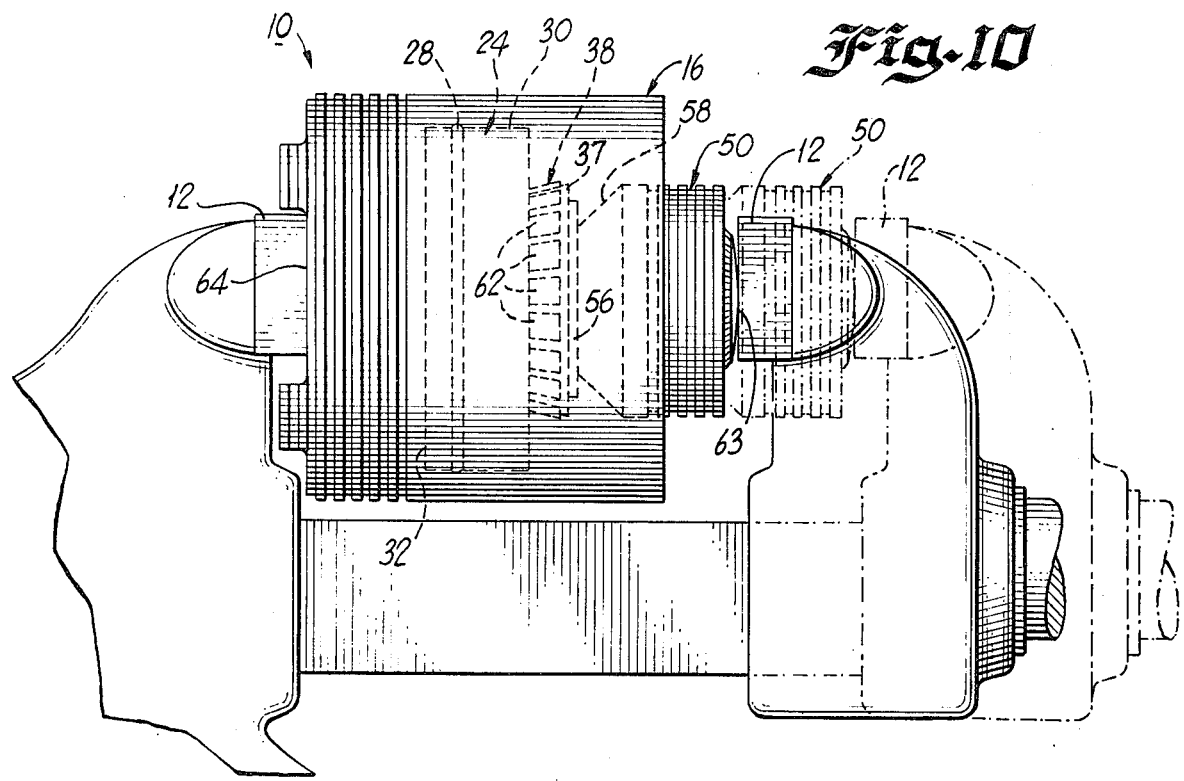
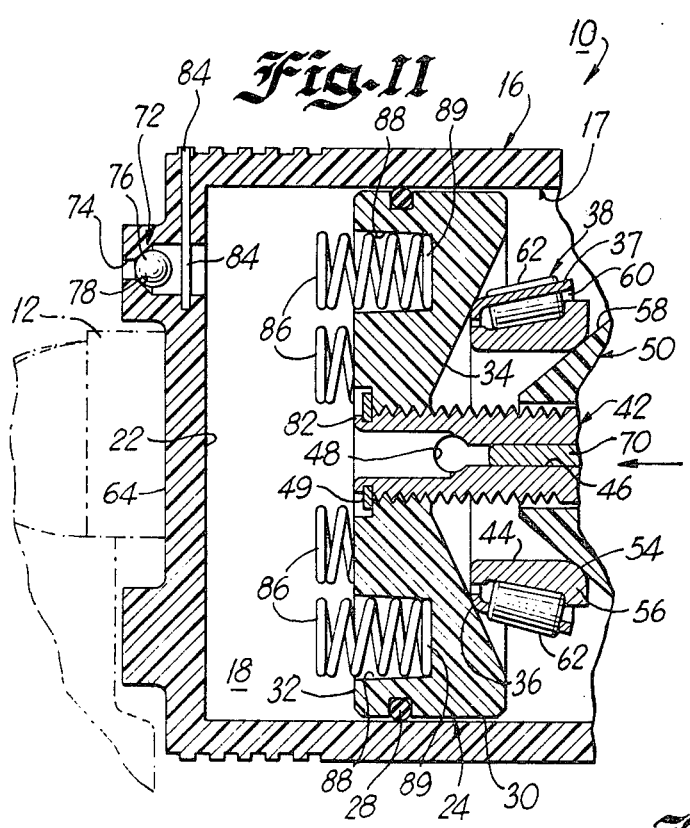
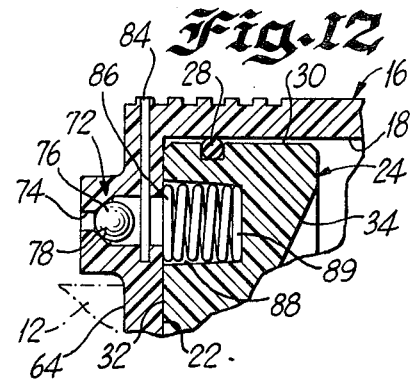
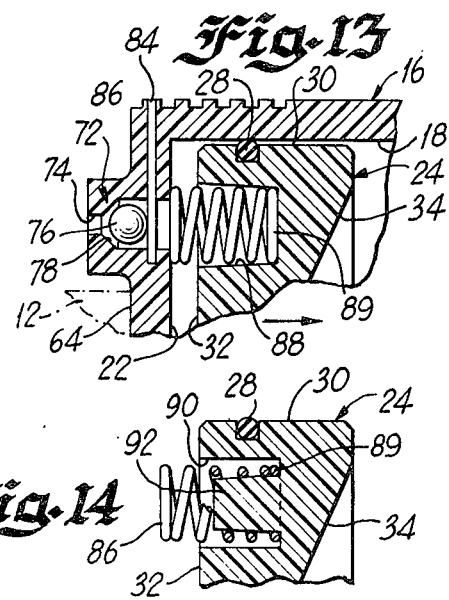

METHOD AND APPARATUS FOR INJECTING VISCOUS MATERIALS

FIELD OF THE INVENTION

The present invention relates to a new and improved method and apparatus for injecting viscous materials into narrow openings and cavities, such as into wheel bearings. More particularly, the present invention relates to a simple tool for injecting grease, such as wheel bearing grease, around unexposed surfaces of a plurality of rollers disposed in a wheel bearing assembly.

BACKGROUND OF THE INVENTION

Vehicle wheel bearings are disposed around the vehicle axles and include a plurality of rollers or bearings to permit relatively frictionless rotation of wheels about the axles. Periodically, these rollers must be lubricated with a very viscous lubricant, commonly called wheel-bearing grease. Wheel bearings generally include an inner, or axle contacting, cylindrical member and a concentric, outer cylindrical member of large diameter, which is spaced apart from, and connected to the inner cylindrical member by virtue of a plurality of intermediate rollers or bearings. The rollers or bearings protrude, both below and above the outer cylindrical portion of the wheel bearing so that an innermost periphery of the bearings contact the outer surface of the axle contacting portion of the wheel bearing, and so that the outermost periphery of the bearings are adapted to contact an inner portion of the wheel for rotating movement. The space provided by the rollers or bearings between the inner cylindrical portion of the wheel bearing and the larger diameter outer cylindrical portion of the wheel bearing must be lubricated periodically in addition to lubricating the exposed portions of the rollers or bearings to provide for continuous rotation of these rollers or bearings during use. Accordingly, it is essential to inject wheel bearing grease between the inner and outer cylindrical wheel bearing members to provide for sufficient lubrication of the rollers during wheel rotation to prevent these rollers from freezing or locking up during vehicle movement. The space between the inner and outer cylindrical members of a wheel bearing is generally very narrow, on the order of 1/32 inch to ¼ inch, and the injection of wheel bearing grease is further difficult because the rollers or bearings are disposed between the inner and outer cylindrical members, making the volume remaining for grease injection between the cylindrical members very small. Further, wheel bearing grease is very viscous, making it quite difficult to inject such material in small spaces.

Prior to the present invention, the most common way for greasing a wheel bearing has been to attempt to insert the grease by hand. Generally, the mechanic will locate a volume of grease in the palm of one hand and, taking the wheel bearing in the other hand, he will attempt to scoop the grease from his palm into the wheel bearing, and, in this manner, try to force the grease between the inner and outer cylindrical wheel bearing members. At the same time, the mechanic will apply grease over the outer exposed portions of the rollers and, by turning the rollers, will cause some grease to roll between the inner and outer cylindrical wheel bearing members. This method has been unsatisfactory because insufficient grease is forced within the wheel bearing necessitating periodic greasing and other wheel bearing maintenance.

Others have attempted to fabricate various devices for the purpose of inserting grease between wheel bearing components but these devices generally have been unsatisfactory because they are cumbersome, expensive and require far too much of a mechanic's time to grease a single wheel bearing. Further, many prior devices have required hydraulic force or other burdensome or expensive means for forcing the grease into the small cavities existing between wheel bearing rollers. Another drawback of prior art wheel bearing greasing devices has been, for example, that the wheel bearing being acted upon does not remain centered in the apparatus, resulting in uneven grease application around the circumference of the bearing, causing uneven bearing wear. Further, the inability of prior art devices to center the wheel bearing or maintain the wheel bearing centered during grease application has caused slippage of the wheel bearing, enabling some of the grease to circumvent the bearing, sometimes without notice by the mechanic.

In accordance with the present invention, a method and apparatus are provided for injecting grease or other viscous materials into contact with unexposed portions of wheel bearing rollers by providing a method and apparatus which is simple and inexpensive and can be used by any mechanic having access to a vice.

DESCRIPTION OF THE PRIOR ART

The following prior art U.S. Pat. Nos. disclose apparatus for injection of a material into openings or apertures:

1,361,007-BROWN
1,991,542-CAVANAUGH
2,031,671-RISING
2,168,746-SAAL ET AL
2,178,816-SIBLEY
2,187,608-KROPP
2,515,208-FOX ET AL
2,968,362-ELLIOTT
3,469,655-MORENO
3,717,222-MOLINE

None of the injecting apparatus described in the above-identified patents is capable of being used with a common vice and none includes a piston capable of being adjusted for operative connection with vice jaws to compensate for the limited span of vice jaws. In accordance with an important object of the present invention, the apparatus described herein includes a piston member having a stem threadedly attached to a central aperture in the piston and a vice-contacting spool slidably disposed over the central stem and adjustable to provide for changes in grease depth to assure that the apparatus can be used repeatedly before re-filling the apparatus housing with grease. The spool can be adjusted inwardly when the housing is first filled with grease so that the apparatus is short enough to fit between fully open vice jaws and the spool can be adjusted outwardly to extend beyond the housing when the housing is almost empty to assure that the spool remains capable of contact with the vice jaws until the housing is emptied. The piston of the present invention is unique in that a central stem is provided for centering the apparatus to be filled with a viscous material and for operative connection to vice jaws over full movement of the piston to the bottom of the housing (or until the housing is substantially empty) while, at the same time, limiting the length of the stem to fit within the housing interior when fully depressed to the bottom of the housing, so that the apparatus can fit between a common vice when filled with grease. The above patents do not provide this capability.

SUMMARY OF THE INVENTION

An object of the present invention is to provide a new and improved method and apparatus for greasing or lubricating an article having a grease-receiving slot, such as a wheel bearing.

Another object of the present invention is to provide a new and improved method and apparatus for injecting viscous material into an annular object having one or more apertures.

Another object of the present invention is to provide a method of inserting grease or other viscous material into a slot disposed between inner and outer cylindrical wheel bearing members by forming an annular seal along both the inner and outer cylindrical members and forcing grease to proceed through the slot, between the seals, by the force of a common vice.

Another object of the present invention is to provide a new and improved method and apparatus for packing wheel bearings with grease. The apparatus includes a piston having a central opening, said piston disposed to fit within a grease container so that by compressing the piston against the grease within the container, grease will be forced outwardly through the central opening in the piston and between the inner and outer cylindrical portions of the wheel bearing.

Another object of the present invention is to provide wheel bearing packing apparatus, including a piston having a central stem for aligning and maintaining alignment of the wheel bearing during use of the apparatus.

Another object of the present invention is to provide wheel bearing greasing apparatus having a spool which fits over the central stem of the piston during operation, and which serves the dual functions of maintaining proper alignment, or centering of the wheel bearing during operation of the apparatus, and forming an inner seal around an inner periphery of the wheel bearing, to prevent grease from escaping through the central aperture of the wheel bearing, thereby causing the grease to be forced within and around the rollers or bearings.

Another object of the present invention is to provide wheel bearing greasing apparatus having an adjustable vice-contacting member adjustable for vice contact at varied distances from an apparatus piston member for repeated greasing operations over a relatively short vice jaw travel path.

Another object of the present invention is to provide a method of injecting a viscous material into a relatively narrow opening by using a simple vice to provide compressive forces needed to cause the material to flow into a desired area.

In brief, the present invention relates to a method and apparatus for injecting a viscous material, such as a lubricant and, particularly, wheel bearing grease, into small apertures, for example, those existing in vehicle wheel bearings. The apparatus or device of the present invention includes a housing defining an internal grease containing chamber, including an open, piston receiving end. A viscous material or lubricant such as wheel bearing grease is disposed within this housing, and a piston is inserted within the housing to sealingly engage interior walls of the housing. The piston is slidably mounted within the chamber and includes a central aperture partially obstructed by a threaded central stem. The stem is threadedly and centrally attached to the piston and provides the only passage for the escape of grease from the housing or grease chamber.

The stem includes a central opening for the passage of grease from the housing or grease chamber as the piston is forced down into the housing or chamber, while maintaining peripheral, sealing contact with the interior housing walls. The piston includes a tapered, bearing-contacting side for sealing engagement with an outer periphery of the wheel bearing. Accordingly, the tapered side of the piston creates a continuous seal completely around the outer cylindrical wheel bearing member through which the rollers or bearings protrude and are partially exposed.

The wheel bearing is disposed over the central upstanding stem of the piston, thereby confining the grease emerging from the aperture in the central stem to the interior of the wheel bearing. The apparatus of the present invention further includes a tapered spool adapted to engage and seal the wheel bearing completely around an interior edge of the inner cylindrical wheel bearing member. The tapered spool is inserted into the wheel bearing along its central access opening to engage the tapered, or conical spool surface completely around the interior of the inner cylindrical wheel bearing member. The spool prevents the grease emerging from the central piston opening, through the stem, from escaping through the central wheel bearing access opening, and thereby causes the grease to follow its only path of escape between the inner and outer cylindrical wheel bearing members. The spool includes a rounded, opposite end portion for engagement by a vice jaw. The bottom of the housing is also adapted to be inserted within an opposite vice jaw so that by compressing the spool and housing, the piston, slidably mounted within the housing, will be forced against the grease in the housing or grease chamber to cause the grease within the chamber to be forced through the central opening of the piston, out the aperture in the piston stem, and between the inner and outer cylindrical wheel bearing members.

It is an important object of the present invention to provide a method and apparatus for injecting grease or other viscous materials into relatively narrow openings or apertures by using a simple vice to provide the force necessary to push such difficulty moved materials into a desired area. Common vices used in car repair shops and by the average consumer have a relatively short vice jaw span. Accordingly, it is a very important object of the present invention to provide apparatus capable of dispensing grease or other vicous or difficulty flowable materials into a desired area by providing means for piston adjustment to provide piston movement greater than a predetermined range of vice jaw movement. This is provided by including a self-aligning spool, slidably disposed over a stem, attached to a central piston aperture, and providing the spool with a spool extension member adjustably connected to the spool for adjustment toward and away from the spool, for vice jaw contact at a desired distance from the apparatus housing. The threaded spool extension member can be adjusted inwardly, into the housing, when the housing is first filled with grease, and, after repeated grease applications, the extension member can be adjusted outwardly, so that the next successive greasing operation might carry the vice jaws over the same travel path as the previous greasing operation while pushing the piston closer to the bottom of the housing. This feature is very important for providing simple apparatus capable of use by the average car owner constructed such that a common vice can be used for operating the apparatus of the present invention.

The central piston stem cooperates with the tapered spool to centrally align the wheel bearing during operation of the apparatus to assure a uniform distribution of grease throughout the entire annular slot between the inner and outer cylindrical wheel bearing portions. During operation of the apparatus, the grease emerges from between wheel bearing rollers as continous ribbons or bands of grease, emerging at substantially the same time and having substantially equal lengths, thereby illustrating and evidencing the uniform distribution of the grease to the wheel bearings by virtue of the method and apparatus disclosed herein. When the grease has emerged from between each of the rollers or bearings, as seen through the transparent or translucent, horizontally disposed housing, the operator of the apparatus knows that the greasing or packing operation has been completed.

The piston stem includes a pivotable handle for removing the piston after the grease within the chamber has dissipated. This handle can be pivoted to a stored position, generally confined within the stem, so that the handle does not interfere with the greasing operation while the apparatus is in use. Further, it has been found that during operation of the apparatus of the present invention, a slight vacuum condition will result between the bottom grease chamber wall and the lower piston surface after a portion of the grease has been removed from the housing or grease chamber. Accordingly, the lowermost piston surface can be provided with a plurality of spring biasing members to provide an upward biasing or piston removing force for piston removal. Further, the grease chamber can be provided with a check valve to permit air outside of the grease chamber to enter the grease chamber and against the lowermost piston surface, when a removing force is applied to the piston, to break the vacuum within the grease chamber when the piston must be removed for further grease insertion into the grease chamber.

BRIEF DESCRIPTION OF THE DRAWINGS

The above and other objects, advantages and novel features of the present invention will become apparent from the following detailed description of a preferred embodiment of the invention illustrated in the accompanying drawings wherein:

FIG. 1 is an exploded perspective view of the various components of the apparatus of the present invention;

FIG. 2 is a vertical cross-sectional view of the apparatus of the present invention;

FIG. 3 is a view taken along the line 3—3 of FIG. 2; and

FIG. 4 is a view similar to FIG. 2 showing the importance of providing a spool extension member for permitting the entire apparatus of the present invention to fit between vice jaws when the grease chamber is substantially empty;

FIG. 5 is an enlarged view of a portion of FIG. 2 illustrating the flow of ribbons of grease between the inner and outer cylindrical members of a wheel bearing;

FIG. 6 is a view taken along the line 6—6 of FIG. 5;

FIG. 7 is a view of the apparatus of the present invention at the completion of the greasing operation;

FIG. 8 is a cross-sectional fragmentary view of the apparatus of the present invention illustrating that the apparatus is capable of greasing bearings of varying size;

FIG. 9 is a view similar to FIG. 8 illustrating a further variation of the size of a bearing being greased;

FIG. 10 is a side elevation view of the apparatus of the present invention illustrating the apparatus disposed within a vice during wheel bearing greasing, wherein the position of the apparatus shown in solid lines is the same as that position shown in FIG. 1, and the position of the apparatus shown in phantom lines indicates the position of the apparatus when the movable vice jaws are opened to their fullest;

FIG. 11 is a partially broken away, cross-sectional view similar to that shown in FIG. 1 showing an alternate embodiment, wherein the apparatus includes a plurality of compression springs mounted on the undersurface of the piston and the body and including tapered bores to retain the springs;

FIG. 12 is a view of a portion of FIG. 11 illustrating the lowermost position of the piston against the bottom grease chamber wall with the compression springs biased for piston removal;

FIG. 13 is a view similar to FIG. 12 showing the compression springs partially expanded and a check valve opened during piston removal;

FIG. 14 is a view illustrating an alternative embodiment illustrating a compression spring secured to the lowermost piston surface.

DESCRIPTION OF THE PREFERRED EMBODIMENT

With reference to the drawings, and initially to FIG. 1, there is illustrated apparatus, generally designated by the reference numeral 10, for injecting grease or other viscous material into one or more slots or apertures. In particular, this apparatus may be used to grease, or pack with lubricant, an article such as a wheel bearing used on a front wheel of an automobile. The apparatus 10 forces grease into small spaces or apertures between adjacent rollers or bearings, forming part of a vehicle wheel bearing assembly. The apparatus 10 is a low-cost device that can be used by mechanics and others who do not have access to more expensive greasing equipment. Accordingly, it is an important feature of the present invention that the lubricating apparatus of the present invention can be operated with a simple vice 12, illustrated in FIGS. 2, 4, 10 and 11 to provide the necessary compressive forces to cause grease to flow through narrow spaces surrounding rollers or bearings in a wheel bearing assembly. The apparatus 10 includes a cylindrical grease receptacle or housing 16, having an annular interior wall 17 which defines a generally cylindrical interior grease-containing chamber 18, having an open, piston receiving end 20 and a bottom or piston-contacting surface 22. The apparatus 10 further includes a piston, indicated generally by reference numeral 24, including a peripheral O-ring or sealing ring 28 for creating a seal between an outer peripheral surface 30 of the piston 24 and the interior housing wall 17. The piston 24, includes a lower, grease-contacting, generally planar surface 32, and an upper, dished, or generally concave or tapered surface 34, having an included angle of 80°–160°; for sealing a lower generally cylindrical outer edge 36 of an outer, cylindrical wheel bearing member 37, forming a part of a wheel bearing, indicated generally by reference numeral 38.

The piston 24 includes a central, threaded aperture 40 for receiving a stem 42, threaded complementary to the threaded aperture 40, for connection to the piston 24. The wheel bearing 38 is located in greasing position over stem 42 by disposing stem 42 through a central axle receiving aperture 44 to seal the cylindrical outer edge 36 of the outer, cylindrical wheel bearing member 37 against the upper, dished piston surface 34, when the apparatus is in operation. The stem 42 further includes a grease receiving passage 46 disposed at or near the dished surface 34 of piston 24 for the passage of grease from grease chamber 18 to the wheel bearing 38. The grease passage 46 extends along the axis of stem 42 and includes a transverse port or bore 48 to provide fluid communication between the grease chamber 18 and the wheel bearing axle receiving aperture 44. Transverse bore 48 directs the grease toward wheel bearing 38 when the wheel bearing 38 is operatively disposed on the dished surface 34 of piston 24. A retaining ring 49 retains the stem 42 within aperture 40.

The apparatus 10 further includes a spool 50 slidably mounted over stem 42 and having a central, elongated, annular aperture 52 slightly larger in diameter than stem 42 so that the spool 50 can be dropped over the stem 42, with wheel bearing 38 in position, to seal the inner surface 54 of an inner, cylindrical wheel bearing member 56. The spool 50 includes a lower, conically tapered surface 58, having an included angle of 50°–110°, to provide a seal against an upper, inner periphery of the inner, cylindrical wheel bearing member 56. Seals created at the outer surface of the outer, cylindrical wheel bearing member 37, and at the inner surface of the inner, cylindrical wheel bearing member 56 will cause grease emerging in the axle receiving wheel bearing aperture 44 from bore 48 to flow through an annular wheel bearing aperture 60, between rollers 62 (FIG. 1).

The spool 50 further includes an extension member 61 threadedly mounted within central, elongated aperture 52 for adjusting the distance d (FIG. 2) between an upper, vice-jaw-contacting, load bearing edge 63 of extension member 60, and a bottom vice-jaw-contacting, load bearing edge 64 of housing 16. The vice-contacting edge 63 of spool extension member 60 is slightly rounded to assure that the vice jaw force is directed centrally down the longitudinal axis of extension member 60. The threaded extension member 60 can be threadedly adjusted to vary the distance d (FIG. 2), as needed to assure that extension member load bearing surface 63 extends outwardly beyond the housing 16 (FIG. 4) so that vice jaws 12 can force piston 24 into grease chamber 18 and to minimize the distance d when the grease chamber 18 is full. Pin 66 prevents spool extension member 60 from being removed from the apparatus 10 when being adjusted to align the apparatus 10 between vice jaws 12.

OPERATION OF THE APPARATUS

Before greasing the wheel bearing 38, the grease chamber 18 is partially filled with grease. The piston 24 is then positioned within the open end 20 of the housing 16 and forced by hand downwardly against the grease in the grease chamber 18. The spool 50 then is positioned around the stem 42 and the piston then is forced into the chamber 18 by applying hand pressure against extension member 63 until grease flows through the transverse aperture 48 in the stem 42. The spool 50 is then removed and the smaller diameter end 68 of spool 50 is placed around the stem 38 to seal the outer surface 36 of the outer, cylindrical wheel bearing member 37 against the concave face 34 of the piston 24. The spool 50 is then positioned around the stem 42 until the conical spool surface 58 sealingly engages the inner periphery 54 of the inner, cylindrical wheel bearing member 56.

Once assembled in this configuration, the apparatus 10 then is positioned within the vice 12 by threading the spool extension member 60 into spool 50 until the apparatus fits between vice jaws 12. The vice jaws then are forced together until the wheel bearing is lubricated as evidenced by ribbons of grease emerging from between the annular slot 60 between inner, cylindrical wheel bearing member 56 and the outer, cylindrical wheel bearing member 37.

The closed bottom end 64 of the housing 16 is shaped to accommodate a vice jaw 12. Closing the vice jaws forces grease through the grease passage 46 and through the transverse aperture 48 to the wheel bearing axle receiving aperture 44. The inner and outer wheel bearing edges 36 and 54 sealingly engage the tapered spool surface 58 and the dished upper surface 34 of piston 24 when the vice jaws 12 are compressed. Grease is forced into and around the individual rollers 62 of the wheel bearing 38 through the annular slot 60. The vice jaws are compressed until the operator of the apparatus 10 observes new grease being forced through the annular slot 60 of the wheel bearing 38, between rollers 62 as continuous ribbons 69 (FIGS. 5 and 6) of substantially equal length. The operator then is assured that the old grease has been forced out of the wheel bearing 38 and new grease has been injected in and around each roller 62. FIG. 10 shows the travel path of vice jaws 12 from an initial position (phantom lines) to a position shown in solid lines when the housing 16 is substantially empty of grease.

At the conclusion of this greasing or packing operation, the piston 24 is abutting or spaced only a slight distance from the bottom surface 22 of grease chamber 18, as illustrated in FIG. 7. The spool 60 and the wheel bearing 38 then are removed from within the grease chamber 18. The stem 42 is provided with a handle 70 pivotable from its stored position about pin 73 in elongated slot 71, as illustrated in phantom lines in FIG. 7, to a removing position as illustrated in solid lines in FIG. 7. The handle 70 can be gripped with the fingers to withdraw the piston 24 from the grease chamber 18. The vice jaw compression operation creates a vacuum within the grease chamber 18 between the closed surface 22 of grease chamber 18 and the lower surface 32 of piston 24 making it difficult to remove the piston 24 by hand. In order to break this high vacuum, a relief valve, generally designated by the reference numeral 72 (FIG. 2) is disposed in the closed end 64 of the housing 16. The relief valve 72 includes a port 74 extending through the closed housing end 22. A ball element 76 is positioned within the port 74 to seal the ball valve 76 against a valve seat 78 within the port 74 during operation of the apparatus (FIG. 4). To relieve the vacuum created within the grease chamber 18 the stem 42 is threaded downwardly within the central piston aperture 26 by gripping handle 70, causing a lower end 82 of the stem 42 to abut against the bottom 22 of grease chamber 18 initially breaking the vacuum. As the stem end engages the housing end the piston 24 is forced away from the bottom surface 22 of grease chamber 18 and lifts the ball valve 26, breaking the vacuum. Pulling handle 70 for piston removal lifts the ball to prevent further vacuum from forming within grease chamber 18 during piston removal. The ball 76 is prevented from entering grease chamber 18 by a ball stop device 84 positioned away from the valve seat 78. The grease chamber 18 may be filled with grease after piston 24 is removed to perform further repeated greasing or packing operations.

In accordance with another embodiment of the present invention, as shown in FIGS. 11-14, springs 86 are secured to the bottom surface 32 of piston 24 to bias the piston 24 against the bottom surface 22 of grease chamber 18 when the housing is substantially empty. The springs 86 help initially to break the vacuum within grease chamber 18 for piston removal. Two alternate means for securing springs 86 to the undersurface of piston 24 are shown in FIGS. 11-14. As shown in FIGS. 11-13, the springs are fitted into tapered bores 88 to frictionally engage the outer surfaces of the uppermost spring coils 89 against the bottommost surface of the bore 88. In accordance with the embodiment set forth in FIG. 14, bores 90 made in the undersurface 32 of piston 24 include downwardly protruding tapered pegs or spring support posts 92 for frictionally engaging the inner surfaces of the uppermost spring coils 89 to secure the springs 86 to the undersurface of piston 24.

Obviously, many modifications and variations of the present invention are possible in light of the above teachings. Thus, it is to be understood that, within the scope of the appended claims, the invention may be practiced other than as specifically described above.

What is claimed and desired to be secured by Letters Patent of the United States is:

1. An assembly for greasing an article comprising:
    a housing defining an internal chamber including a first open end;
    a piston slideably insertable into said chamber, said piston including a threaded aperture;
    a stem threadably mounted in said aperture;
    a compression application member mounted on said stem; and
    an extension member threadably secured to said compression application member and adapted to be engaged by a compression application tool.

2. The assembly claimed in claim 1 further comprising vacuum release means in a second closed end of said housing for relieving a vacuum in said chamber.

3. The assembly claimed in claim 1 wherein said stem further includes a handle pivotally mounted thereon, and extending along the axis of said stem in a first, stored position.

4. The assembly claimed in claim 1 wherein said piston includes a first, planar face and a second concave face, and said compression application member includes a first substantially conical end, said article being positioned between said concave face and said conical end.

5. An assembly for packing wheel bearings and the like comprising:
    a cylindrical housing including a first closed end and a second open end;
    a piston for insertion into said housing;
    a stem threadably secured in and through said piston for removing said piston from said housing;
    a spool slideably mounted on said stem; and
    an extension member threadably coupled to said spool.

6. The assembly set forth in claim 5 wherein said stem includes a handle pivotally connected thereto and moveable to a first stored position extending along the axis of said stem during said packing and to a second position transverse to said axis for removal of said piston.

7. The assembly set forth in claim 5 further comprising a vacuum release valve defined in said first closed end of said housing.

8. The assembly set forth in claim 5 wherein said piston includes a first planar side and a second concave side, said spool includes a conical end, said bearing being positioned between said concave side and said conical end and around said stem during said packing.

9. An assembly for packing wheel bearings and the like comprising:
    a cylindrical housing including a first closed end and a second open end;
    a piston adapted to be inserted into said housing including a threaded aperture, said piston further including a first planar side and a second concave side;
    a stem threadably mounted in said aperture including a passage for communicating grease and the like from said first side of said piston to said second side;
    a spool slidably mounted on said stem including a conical end; and
    said bearing being positioned between said second side of said piston and said conical end of said spool during said packing.

10. The assembly claimed in claim 9 further comprising a vacuum release in said closed end of said housing.

11. The assembly claimed in claim 9 further comprising an extension member threadably mounted on said spool.

12. A method of applying a lubricant to a bearing comprising inserting said bearing into a lubricant chamber to seal an outer peripheral surface of said bearing against a tapered surface of a piston member disposed within said lubricant chamber;
    sealing an inner peripheral surface of said bearing with tapered spool member by inserting said tapered spool member within a central aperture in said bearing;
    adjusting a spool member extension member such that the lubricant chamber fits between vice jaws of a common vice; and
    compressing said vice jaws to force grease through a central opening in said piston member and outwardly into said bearing.

13. The assembly as defined in claim 9 wherein said spool is tapered to an included angle in the range of 50°-110°.

14. The assembly as defined in claim 12 wherein said piston includes springs secured to said planar side.

* * * * *